(12) United States Patent
La Commara et al.

(10) Patent No.: US 9,834,302 B2
(45) Date of Patent: Dec. 5, 2017

(54) AIRCRAFT LANDING GEAR PROVIDED WITH AN ADJUSTABLE ROLLER

(71) Applicant: MESSIER-BUGATTI-DOWTY, Velizy-Villacoublay (FR)

(72) Inventors: Domenico La Commara, Velizy-Villacoublay (FR); Thibault Faure, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/774,055

(22) PCT Filed: Mar. 12, 2014

(86) PCT No.: PCT/EP2014/054897
§ 371 (c)(1),
(2) Date: Sep. 9, 2015

(87) PCT Pub. No.: WO2014/140139
PCT Pub. Date: Sep. 18, 2014

(65) Prior Publication Data
US 2016/0016657 A1  Jan. 21, 2016

(30) Foreign Application Priority Data
Mar. 12, 2013  (FR) ...................... 13 52208

(51) Int. Cl.
B64C 25/26 (2006.01)
(52) U.S. Cl.
CPC ................... B64C 25/26 (2013.01)

(58) Field of Classification Search
CPC ...................................... B64C 25/26
See application file for complete search history.

(56) References Cited

U.S. PATENT DOCUMENTS

| | | | | |
|---|---|---|---|---|
| 2,504,458 A * | 4/1950 | Schmidt | ................. | B64C 25/26 244/102 SL |
| 2,621,004 A * | 12/1952 | Ashton | ................... | B64C 25/12 244/102 R |
| 2,720,369 A * | 10/1955 | Detzer | .................... | B64C 25/26 24/598.4 |
| 6,279,853 B1 * | 8/2001 | Brighton | ................. | B64C 25/26 244/102 R |

FOREIGN PATENT DOCUMENTS

| | | |
|---|---|---|
| EP | 1 016 590 A1 | 7/2000 |
| GB | 531750 A | 1/1941 |
| GB | 704080 A | 2/1954 |

OTHER PUBLICATIONS

International Search Report for PCT/EP2014/054897 dated Apr. 16, 2014 [PCT/ISA/210].

* cited by examiner

*Primary Examiner* — Justin M Benedik
(74) *Attorney, Agent, or Firm* — Sughrue Mion, PLLC

(57) ABSTRACT

The invention relates to an aircraft undercarriage intended to be mounted so as to be able to move on the aircraft between a deployed position and a retracted position, the undercarriage comprising a roller (1) carried by a support (4) secured to the undercarriage while being able to be moved with respect thereto, characterised in that the support is mounted pivotally on the undercarriage.

4 Claims, 2 Drawing Sheets

AIRCRAFT LANDING GEAR PROVIDED WITH AN ADJUSTABLE ROLLER

The invention relates to an aircraft undercarriage provided with an adjustable roller for attaching it in the retracted position in an aircraft hold.

TECHNOLOGICAL BACKGROUND OF THE INVENTION

Undercarriages are in general held in the retracted position by a hook installed in the hold that hooks onto a roller carried by the undercarriage when the latter arrives in the retracted position. Because of deformations, assembly clearances and machining tolerances, it is necessary to provide a possibility of adjustment of the position of the roller in order to guarantee that the hook can hook onto the roller on every occasion. In general, the roller is mounted on a support that is attached to one of the elements of the undercarriage by means of a force-takeup bolt or screw that extends with clearance through an orifice in the support so that the latter can be moved laterally in order to adjust the position of the roller. Once the correct position of the roller has been found, screws immobilising the support on the undercarriage are then tightened. It is also possible to interpose shims between the support and the undercarriage element in order to adjust the height of the roller.

SUBJECT MATTER OF THE INVENTION

The subject matter of the invention is proposing means for adjusting the position of the roller that are easy to use by the team responsible for adjusting the roller.

PRESENTATION OF THE INVENTION

To this end, an aircraft undercarriage is proposed, intended to be mounted so as to be able to move on the latter between a deployed position and a retracted position, the undercarriage comprising a roller carried by a support secured to the undercarriage while being movable with respect to the latter, in which, according to the invention, the support is mounted pivotally on the undercarriage.

Apart from the height of the roller, which is generally adjusted with shims, the position of the roller is generally adjusted in a favoured adjustment direction. It suffices to mount the pivoting support on an axis normal to the favoured adjustment direction. Pivoting the support then makes it possible to move the roller very easily in the favoured adjustment direction (with a small transverse component, which can in any event be taken up by shims).

According to a preferred embodiment, the support is secured to an articulation shaft of the undercarriage. Thus it suffices to turn the articulation shaft in order to pivot the support. Preferably then, the support is secured to the shaft by means of a takeup screw that passes through the wall of the shaft and is screwed into a nut slid inside the shaft. Preferably then, the shaft is associated with means for adjusting its angular position.

DESCRIPTION OF THE FIGURES

The invention will be better understood in the light of the following description of a particular embodiment of the invention with reference to the figures of the accompanying drawings, among which.

DETAILED DESCRIPTION OF A PARTICULAR EMBODIMENT

Figure 1:
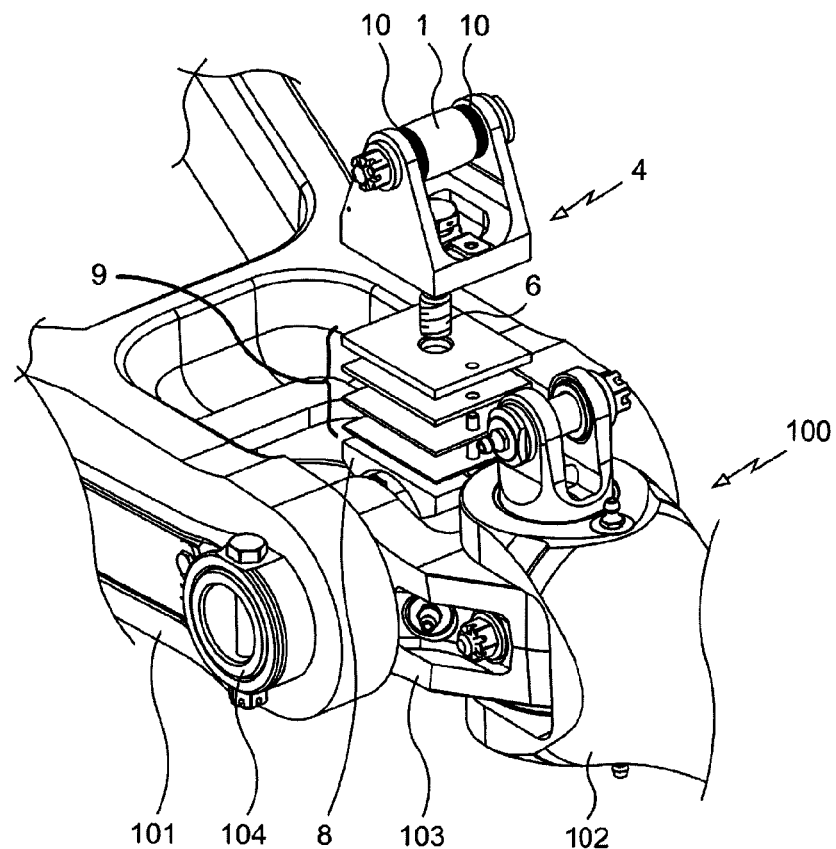
FIG. 1 is a perspective view of part of an undercarriage equipped with a roller and its support according to the invention.

FIG. 1 illustrates a strut 100 of an auxiliary undercarriage of a commercial aircraft. The top panel 101 of the strut and the bottom strut arm 102 can be recognised. The two strut elements are connected together by means of universal joint 103 that is articulated on the top panel 101 by means of an articulation shaft 104 forming the knuckle joint of the strut.

The undercarriage is here equipped with a roller 1 that is fitted on an arbor 2, itself mounted between two cheeks 3 of a support 4. The support 4 comprises a base 5 with a flat base that is pierced to enable a force-takeup screw 6 to pass.

Figure 2:
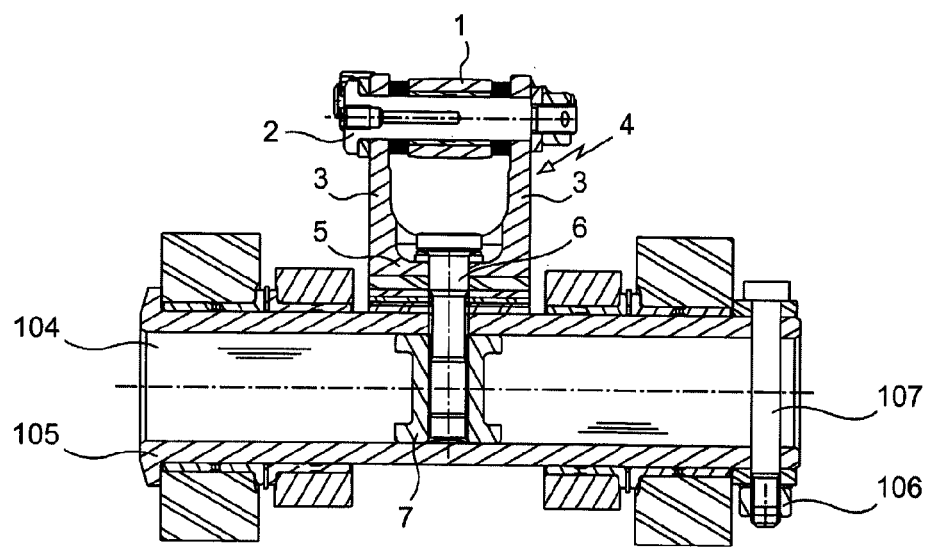
FIG. 2 is a view in longitudinal section of the shaft carrying the support of the roller.
Figure 4:
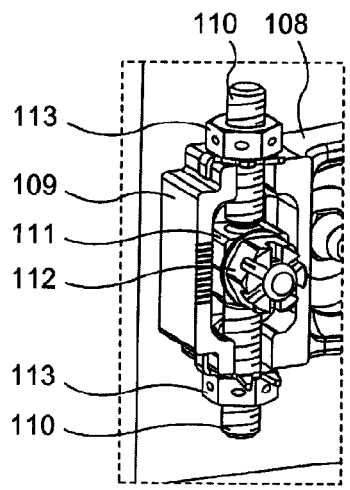
FIG. 4 is an enlarged detail view of the member for adjusting the angular position of the shaft.
Figure 5:
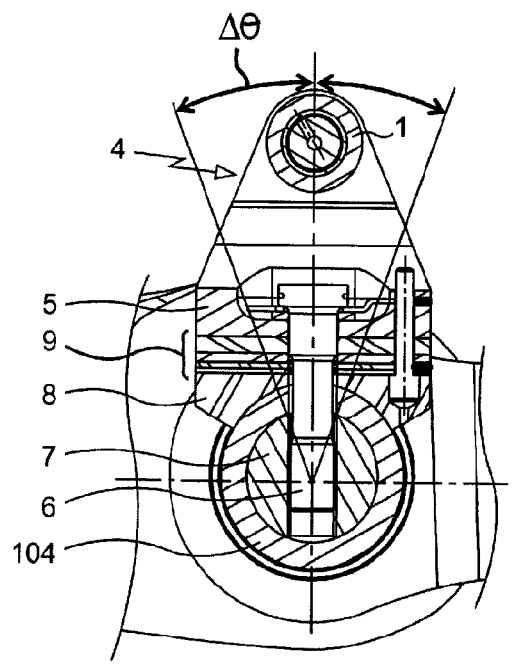
FIG. 5 is a side view with partial cross section showing the support of the roller on its shaft, as well as the amplitude of angular adjustment of the roller.

In accordance with the invention, and as is more particularly visible in FIG. 2 and in FIG. 5, the support 4 is attached to the articulation shaft 104. For this purpose, a nut 7 has been introduced into the articulation shaft 104 in order to receive the force-takeup screw 6. Between the base 5 and the shaft 104 there have been interposed firstly a shape shim 8 to enable the base 5 to bear on the shaft 104, and secondly thickness shims 9 that are intended to adjust the height of the roller 1. Thus it suffices to turn the articulation shaft 104 with respect to the strut panel 101 in order to move the roller in an angular range AO. Adjustment of the roller 1 is then simplified. The screw 6 firmly secures the support 4 to the articulation shaft 104 and, whatever the position of the roller 1, remains aligned with the roller 1.

To adjust the lateral position of the roller 1 on the arbor 2, it is necessary to interpose shims 10 on either side of the roller 1 in order to position the latter along the arbor 2.

Figure 3:
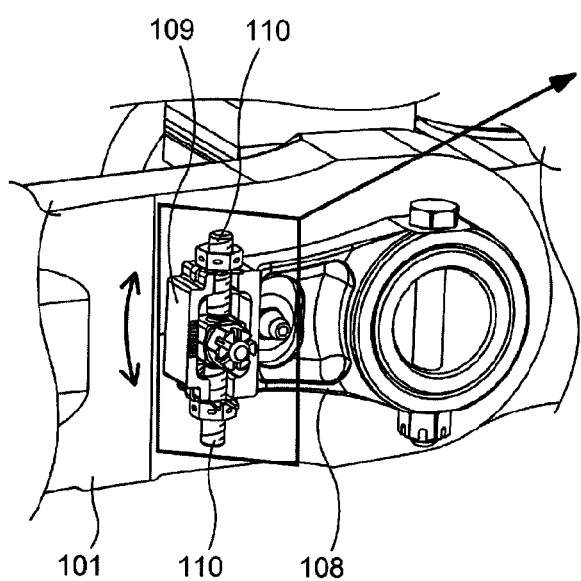
FIG. 3 is a partial perspective view of the undercarriage illustrating the member for adjusting the angular position of the shaft.

According to an advantageous aspect of the invention illustrated in FIGS. 3 ad 4, the articulation shaft 104 is equipped with means for adjusting its angular position. More precisely, the articulation shaft 104 comprises on the one hand the a head 105 for axial stopping thereof and carries on the other side a ferrule 106 that is attached to the shaft 104 and stopped by a pin 107. The stoppage of the ferrule 106 by the pin 107 achieves both an axial stop and an angular location. The ferule 106 is extended by a lever 108 that terminates in a cage 109 on which two adjustment screws 110 are screwed so as to project inside the cage 109. The adjustment screws 110 extend opposite each other and cooperate with a block 111 that extends projecting from the strut panel 101. Here the block 111 is attached to the strut panel 101 by means of a bolt 112. By screwing the two adjustment screws 110 to a greater or lesser extent, while ensuring that they both remain in contact with block 111, it is thus possible to move the lever 108 with respect to the block 111 and therefore to vary the angular position of the articulation shaft 104 with respect to the strut panel 101 very precisely. The immobilisation in position is achieved by means of two locknuts 113 that immobilise the adjustment screws 110 on the cage 109.

The invention is not limited to what has just been described but on the contrary encompasses any variant falling within the scope of the claims.

In particular, although in the example illustrated the roller is secured to an articulation shaft of the undercarriage (in this case the strut knuckle shaft), which is a structural shaft of the undercarriage, the invention is not limited to the use of such articulation shafts, and it will be possible to provide for the mounting of a dedicated shaft allowing angular movement of the roller.

The invention claimed is:

1. An aircraft undercarriage intended to be mounted so as to be able to move on the aircraft between a deployed position and a retracted position, the undercarriage comprising:
    a roller (1) for hooking the undercarriage in the retracted position, and
    the roller being carried by a support (4) secured to the undercarriage while being able to be moved with respect thereto,
    wherein the support is mounted pivotally on the undercarriage,
    wherein the support is secured to an articulation shaft (104) articulating two elements (101, 102) of the undercarriage,
    wherein the articulation shaft is equipped with means (108, 109, 110) for adjusting its angular position, and
    wherein the adjustment means comprise a lever (108) secured to the articulation shaft and terminating in a cage (109) carrying two adjustment screws (110) mounted opposite each other in order to cooperate with a block secured to one of the elements (101) of the undercarriage articulated by the articulation shaft.

2. The undercarriage according to claim 1, in which the support comprises two cheeks (3) carrying an arbor (2) on which the roller (1) is fitted.

3. The undercarriage according to claim 1, in which the support comprises a base (5) with a flat bottom, a shape shim (8) being interposed between the base and a shaft (104) to which the support is secured.

4. The undercarriage according to claim 3, in which the support is secured to the shaft by means of a force-takeup screw that passes through the base and is screwed into a nut (7) introduced inside the shaft.

\* \* \* \* \*